United States Patent [19]
Gahan et al.

[11] Patent Number: 4,793,690
[45] Date of Patent: Dec. 27, 1988

[54] REARVIEW MIRROR CONTROL CIRCUIT

[75] Inventors: Edward A. Gahan, Holland, Mich.; Keith W. Molyneux, Ballymore Eustace, Ireland; Kenneth Schofield, Holland, Mich.

[73] Assignee: Donnelly Corporation, Holland, Mich.

[21] Appl. No.: 43,210

[22] Filed: Apr. 27, 1987

Related U.S. Application Data

[63] Continuation-in-part of Ser. No. 888,130, Jul. 18, 1986, abandoned, which is a continuation-in-part of Ser. No. 888,129, Jul. 18, 1986, abandoned.

[51] Int. Cl.$^4$ .............................................. G02B 17/00
[52] U.S. Cl. ................................... 350/279; 350/280; 250/214 D
[58] Field of Search ............................... 350/278–282, 350/634, 636, 331 R; 250/214 AL, 214 B, 214 D

[56] References Cited

U.S. PATENT DOCUMENTS

| | | |
|---|---|---|
| 3,601,614 | 8/1971 | Platzer . |
| 3,612,666 | 10/1971 | Rabinow . |
| 3,680,951 | 8/1972 | Jordan et al. . |
| 3,722,984 | 3/1973 | Brean .................. 350/280 |
| 3,746,430 | 7/1973 | Brean et al. . |
| 3,807,832 | 4/1974 | Castellion . |
| 3,862,798 | 1/1975 | Hopkins . |
| 4,161,653 | 7/1979 | Bedini et al. . |
| 4,181,406 | 1/1980 | Kohara et al. . |
| 4,200,361 | 4/1980 | Malvano et al. . |
| 4,249,160 | 2/1981 | Chilvers . |
| 4,309,082 | 1/1982 | Kohara et al. . |
| 4,443,057 | 4/1984 | Bauer et al. . |
| 4,491,390 | 1/1985 | Tong-Shen . |
| 4,512,637 | 4/1985 | Ballmer . |
| 4,529,873 | 7/1985 | Ballmer et al. . |
| 4,531,814 | 7/1985 | Ballmer . |
| 4,572,619 | 2/1986 | Reininger et al. . |
| 4,580,875 | 4/1986 | Bechtel et al. . |
| 4,585,339 | 4/1986 | Senoo . |
| 4,603,946 | 8/1986 | Kato et al. . |
| 4,690,508 | 9/1987 | Jacob .................. 350/279 |

FOREIGN PATENT DOCUMENTS 2732727  3/1978  Fed. Rep. of Germany .

OTHER PUBLICATIONS

Fry, "Measurement, Specification and Prediction of Transient States of Adaptation", 59 Illuminating Engineering 453 (1964).
Schmidt, "A Short Physiological Optics Review for Designers and Users of Automobiles", Visual Considerations of Man, the Vehicle, and the Highway (SAE Publication No. SP-279 Mar. 1966).

Primary Examiner—John K. Corbin
Assistant Examiner—Loha Ben
Attorney, Agent, or Firm—Price, Heneveld, Cooper, DeWitt & Litton

[57] ABSTRACT

The specification discloses an automatic rearview mirror control circuit which models the physiological response of the human eye to fluctuating light levels as observed in typical driving conditions. The control circuit calculates an ambient light signal representative of light levels within the driver's field of view and a rear light signal representative of light levels in a direction generally incident to the reflective element. The reflectivity of the reflective element is controlled to optimize rear image information while minimizing on rear image glare at the driver's eyes. The control circuit includes a multiple-rate filter for time-averaging an ambient light signal over a shorter time period during increasing ambient light intensities than during decreasing ambient light intensities to simulate the more rapid adaptation of the human eye to increasing light intensities than to decreasing light intensities. The control circuit automatically alters or adjusts the sensitivity of the mirror to rear light based on the ambient light level. The mirror is more sensitive to rear light in relatively low ambient light, such as experienced on rural highways, than in relatively high ambient light, such as is experienced on urban highways. The control circuit calculates ambient light within the driver's field of view. The calculation takes into account the forward light, rear light reflected from the interior rearview mirror, and/or rear light reflected from the windshield, pillars, headliner, and exterior rearview mirrors.

52 Claims, 5 Drawing Sheets

REARVIEW MIRROR CONTROL CIRCUIT

This application is a continuation-in-part of pending application Ser. No. 888,130, filed July 18, 1986, entitled REARVIEW MIRROR CONTROL CIRCUIT WITH DUAL-RATE FILTER, and a continuation-in-part of pending application Ser. No. 888,129, filed July 18, 1986, entitled REARVIEW MIRROR CONTROL CIRCUIT WITH AUTOMATIC SENSITIVITY COMPENSATION, both now abandoned.

BACKGROUND OF THE INVENTION

The present invention relates to rearview mirrors, and more particularly to rearview mirrors capable of automatically changing their reflective states in response to varying light levels.

High light levels reflected from a rearview mirror into the eyes of a vehicle operator during night driving can seriously impair the operator's forward vision. Light scatters within the eye causing a "veil" or "curtain" of light over the scene. The driver therefore has a reduced ability to detect objects which are dimly lit or have little contrast with the background. This situation is known as disability glare. The driver is normally unable to detect this loss of visibility since there is no physical sensation associated therewith. At higher reflected light levels, discomfort glare occurs, resulting in an unpleasant physical sensation in the driver's eyes.

Manually actuated rearview mirrors have been developed which include "day" and "night" settings. These day/night mirrors include a mirror prism and a mechanism for changing the angular orientation of the prism. In the "day" setting, the mirror prism is angularly set to provide approximately 80% reflectance of the rearward image into the driver's eyes. In the "night" setting, the prism is angularly set to provide only approximately four percent of the full reflectance of the rearward image into the driver's eyes. These mirrors suffer several disadvantages. First, the mirrors must be manually actuated or switched between the day and night settings. This can be a distraction when the driver should be concentrating his full attention on the operation of the vehicle. Second, when in the night setting, the mirror reduces the driver's ability to obtain information from the mirror because of the greatly reduced reflectance. Third, when in the day setting, quickly-appearing bright lights in the mirror can seriously impair the driver's vision.

"Automatic" day/night rearview mirrors have been developed which automatically switch the mirror prism between full and partial reflectance conditions in response to sensed light levels. One such mirror is illustrated in U.S. Pat. No. 4,443,057, issued Apr. 17, 1984 to Bauer et al, entitled AUTOMATIC REARVIEW MIRROR FOR AUTOMOTIVE VEHICLES. The Bauer mirror includes a forward light sensor providing a signal representative of light forward of the mirror, a rear light sensor providing a signal representative of light rearward of the mirror, and a control circuit responsive to the independent forward and rear signals to control the mirror prism position. When the rear sensor signal exceeds a value dependent on the conditioned independent forward signal, the mirror prism is switched to the partial reflectance mode. Time-averaging filters filter the output of both the forward and rear light sensors. These filters prevent light "spikes" from momentarily changing the reflective state of the prism. This reduces excessive actuation of the mirror between its full reflectance and partial reflectance modes in response to changing light conditions of relatively short duration, such as passed street lights The time constant provided by the forward signal filter is longer than the time constant provided by the rear signal filter so that (1) the ambient light reference level is more slowly affected by changing light levels to provide a reliable reference level and (2) the rear signal is adequately responsive to changes in rear light levels.

The Bauer control circuit is not without its drawbacks. First, the ambient light reference level does not adequately track the changing sensitivity of the driver's eyes which changes due to the varying ambient and rear light levels experienced under typical driving conditions. One cause of this is that the independent forward signal is filtered or time averaged using a single time constant. However, it is known that the human eye adapts more quickly to increasing light levels than it does to decreasing light levels. Second, the signal used to compute the ambient light reference level is dependent only on the light levels forward of the mirror housing and is not dependent on other significant light levels within the driver's field of view. In summary, the mirror prism is sometimes actuated when not necessary to meet the sensitivity of the human eye and sometimes not actuated when necessary to meet the sensitivity of the human eye.

The ideal rearview mirror would provide maximum image brightness at all times consistent with the need to reduce rear glare to acceptable levels, thus maintaining optimum forward and rearward visibility. To achieve this result, the rearview mirror must calculate the dynamic glare tolerance of the driver's eyes, which is an indication of the glare that can be directed into the driver's eyes without causing disability glare or discomfort glare.

SUMMARY OF THE INVENTION

The present invention overcomes the above noted problems by providing an automatic rearview mirror which includes circuitry to control the reflective element in a manner dependent on dynamic lighting conditions to more closely approximate the physiological adaptation of the human eye. The present rearview mirror therefore provides a desirable balance between image information and glare reduction.

The present invention incorporates a mathematical model of the human eye based on documented physiological responses on the human eye to different and/or changing lighting conditions. First, the mathematical model provides an adaptation time approximating that of the human eye, wherein the adaptation rate is determined by the direction of the change. The mathematical model, like the eye, adjusts to cope with falling light levels more slowly than with rising light levels. The adaptation times are also affected by the absolute light level. Accordingly, the adaptation model is dependent on the history of ambient light intensity.

Second, the mathematical model alters the sensitivity of the mirror in a manner dependent on the occular adapted ambient light level. The eye's sensitivity, or tolerance to glare, under steady-state conditions varies depending on the absolute ambient light level. For example, when the ambient light is relatively low, the eye is extremely sensitive to bright lights such as high beams or misaligned headlights. This occurs most notably when driving on a country road and a bright light appears suddenly in the rearview mirror. The present mirror control circuit provides a sensitivity compensation to model this changing tolerance for glare. The control circuit renders the mirror more sensitive in relatively dark ambient light than in relatively bright ambient light.

Third, the present mathematical model provides an improved calculation of the ambient light within the total field of view of the driver. The light within the driver's field of view but not within the forward facing sensor's field of view include light from sources rearward of the vehicle reflected back to the driver's eyes from the inside rearview mirror, the outside rearview mirrors, and the interior surfaces of the vehicle. The total "ambient" light which influences the driver's eyes is therefore made up of light from sources emanating forward of the mirror housing and light reflected back to the driver's eyes from the inside rearview mirror, the outside rearview mirrors, the dashboard, and the inside surface of the front windshield. The present mathematical model provides an improved ambient light calculation by taking into account this light impinging on the driver and emanating from sources other than forward of the mirror housing. The control circuit calculates ambient light as a combination of both the forward and rear sensor signals to more closely approximate the ambient light actually experienced by the driver.

The present rearview mirror control circuit therefore more accurately establishes (1) the ambient light level within the driver's field of view and (2) the driver's glare tolerance so that the mirror reflectivity can be controlled to reduce the light reflected from the mirror to a level below the driver's glare tolerance.

Both digital and analog embodiments are illustrated embodying the mathematical model. Both embodiments include a reflective element actuatable between at least two different reflective states, a rear light sensor, a forward light sensor, and a control circuit responsive to the rear and ambient light sensors to actuate the reflective element between its reflective conditions. The control circuit includes a multiple-rate time-averaging circuit for time averaging the ambient light signal as in the general mathematical model so that the mirror adapts to increasing ambient light more rapidly than it does to decreasing ambient light. The control circuit further alters the sensitivity of the mirror in response to the ambient light level so that the mirror is more sensitive in relatively low ambient light levels than in relatively high ambient light levels. Third, the control circuit provides an ambient light calculation which is a combination of both the forward and rear light levels to more closely approximate the light within the driver's field of view.

These and other objects, advantages, and features of the invention will be more readily understood and appreciated by reference to the detailed description of the preferred embodiment and the drawings.

DETAILED DESCRIPTION OF THE PREFERRED EMBODIMENT

I. Mathematical Model

Figure 1:
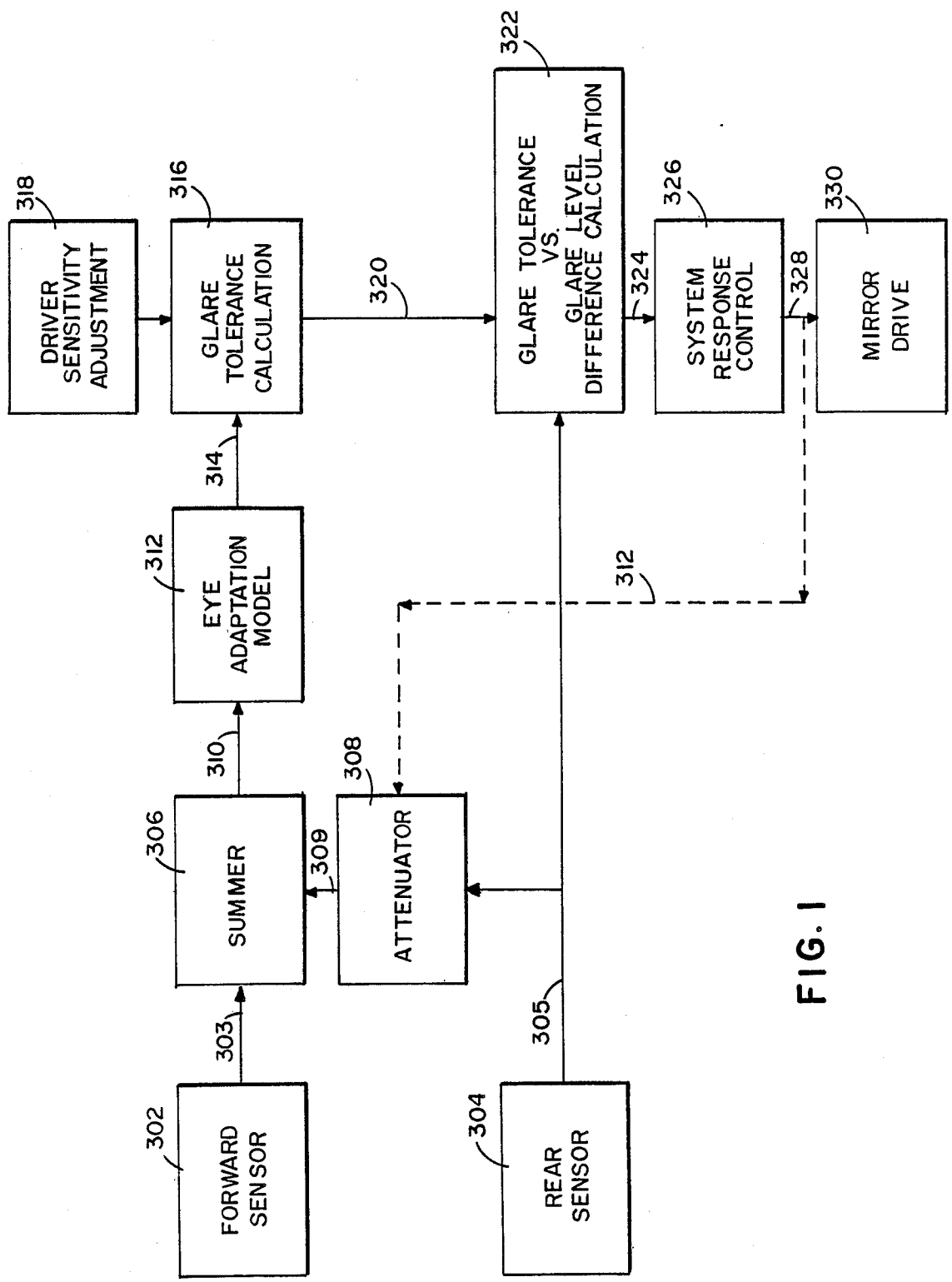
FIG. 1 is a block diagram illustrating the functional block diagram of the present rearview mirror control circuit.

The functional block diagram of the present invention is illustrated in FIG. 1. The model includes a forward light sensor 302 and a rear light sensor 304 mounted in the mirror casing to detect light generally forwardly of and generally rearwardly of the mirror casing.

The ambient light level, which influences the driver's eyes and therefore the glare sensitivity of the eyes, is made up of light emanating forward of the mirror housing and light reflected back to the driver's eyes from the inside rearview mirror, the outside rearview mirrors, the dash, and the inside front surface of the windshield. The summer 306 and attenuator 308 combine the forward and rearward signals in a manner approximating the actual ambient light perceived by the driver. Specifically, the attenuator 308 provides an attenuated portion of tee rear signal to the summer 306, which adds the forward signal from the sensor 302 and the attenuated rearward signal from the attenuator 308 to produce an ambient light signal on line 310. Since the reflectivity of the inside rearview mirror affects the portion of the rear light signal to be used in the ambient light calculation, changes in reflectivity modify the proportion of the rear light level to be added to the forward light level. In the model illustrated in FIG. 1 the dashed line 312 provides the feed-back from the actual mirror reflectivity to the attenuator 308 to control the attenuator to provide the proper level of the rearward signal. Although the attenuator is responsive to the reflective condition of the rearview mirror, it also ideally adds a constant portion of the rear signal to the summer 306 indicative of reflectance off the inside of the windshield and unchangeable outside rearview mirrors. The ambient light calculation can be represented by the equation:

$$A = F + c_1 rR + c_2 R$$

Where A is the ambient light level
F is the forward light level
R is the rear light level
r is the actual percent reflectance of the reflective element
$c_1$ and $c_2$ are constants The three terms represent the contribution to the light within the driver's field of view from (1) the light within the forward sensor's field of view, (2) the light reflected from the rearview mirror, and (3) the light reflected from the exterior rearview mirrors and interior surfaces.

The eye adjusts to cope with varying light levels to which it is exposed. This accommodation occurs at a rate determined by the direction and range of the change in light level. The eye adjusts to cope with falling light levels more slowly than it adjusts to cope with rising light levels. The eye's slowness in adapting to decreasing light levels can be readily observed when one walks into a dark room and must wait up to ten minutes before being able to distinguish objects within the room. Further, the eye adapts much slower in the scotopic range (up to approximately 0.1 lux) than in the photopic range (above approximately 10 lux). In the mesopic range, which is most pertinent to night driving, adaptation to increasing light levels is approximately exponential with a time constant of 10 seconds; and adaptation to decreasing light levels is also approximately exponential with a time constant of 100 seconds. This can be represented by the equation:

$$M = \begin{cases} M_o + \Delta M(1 - e^{-t/T_i}) & \text{during increasing light} \\ M_o - \Delta M(1 - e^{-t/T_d}) & \text{during increasing light} \end{cases}$$

Where M is the occular adapted ambient light level
$M_o$ is the original occular adapation light level
$\Delta M$ is the change in the ambient light level
$T_i$ is the time constant for increasing light levels
$T_d$ is the time constant for decreasing light levels
t is the elapsed time since the change in light level This asymmetric accommodation is simulated in the eye adaptation model 312 which outputs an occular adapted ambient light signal on line 314 responsive to the history of the ambient light signal on line 310. The occular adapted light signal is equivalent to the steady state ambient light level which would result in a particular eye sensitivity at a particular point in time in a dynamic situation. Specifically, the signal on line 314 rises relatively quickly in response to an increasing signal on line 310; and the signal on line 314 falls relatively slowly in response to a decreasing signal on line 310. For example, different time constants can be used to time average the ambient signal depending on whether this signal is rising or falling.

The occular adapted ambient signal outputted on line 314 is used to calculate the eye's tolerance to glare. This calculation is performed in the glare tolerance calculation box 316. Research has shown the relationship between ambient light levels and glare tolerance under steady state conditions to be of the form:

$$GT = CM^n + B$$

Where
GT is the glare tolerance
M is the occular adapted ambient light level
n, B, and C are constants and will vary from individual to individual depending on eye sensitivity to light, age, and whether discomfort gaare or disability glare is being calculated The spread of response due to such factors as the driver's age can be accommodated by appropriately adjusting the values of the constants B and C. These constants can be selected by the driver using the sensitivity adjustment 318 which is typically a manually actuated switch in the mirror casing.

The signal indicative of the driver's glare tolerance is outputted on line 320 to block 322, which also receives the rear light signal via the line 305. In block 322, the signal from the rear light sensor is evaluated to determine whether it exceeds the level which would be considered intolerable glare. Block 322 provides an output on line 324 which is indicative of the desired amount of change in reflectivity of the reflective element to provide optimum image content without exceeding the glare tolerance. In the case of continuously variable reflective elements, an optimum reflectivity can be calculated which reduces the light level to just below the glare tolerance as follows:

$$REF = \frac{GT}{R}$$

REF is the desired reflectivity
GT is the calculated glare tolerance
R is the rear sensor signal In the case of bi-model prisms, the prism reflectivity level just below the REF calculation would be selected.

The system response control 32 receives the signal on line 324 and issues an appropriate control signal via line 328 to the mirror drive 330. The system response control 326 and the mirror drive 330 will be dependent upon the mirror type and both are generally well known to those having ordinary skill in the art. The system can control mirrors of at least two basic types. The first type is a high/low device with two states of reflectivity such as a motor-driven bi-modal prism, a liquid crystal mirror, or any other two-state electro-optic device. The second type is a variable reflectivity device such as an electrochromic (EC) mirror cell. The purpose of blocks 326 and 330 is to use the glare level evaluation on line 324 in a manner which is appropriate for the particular total system.

The mathematical model of the present invention will be described in conjunction with both analog and digital embodiments. Neither embodiment should be interpreted to limit the generality of the mathematical model wherein (1) the control circuit responds to changing ambient light conditions in a manner dependent on the history of past lighting levels; (2) the sensitivity of the control circuit to glare changes as a function of the ambient light level; and (3) the ambient light level is calculated as a function of both the forward and rearward light levels

II. Digital Implementation

Figure 2:
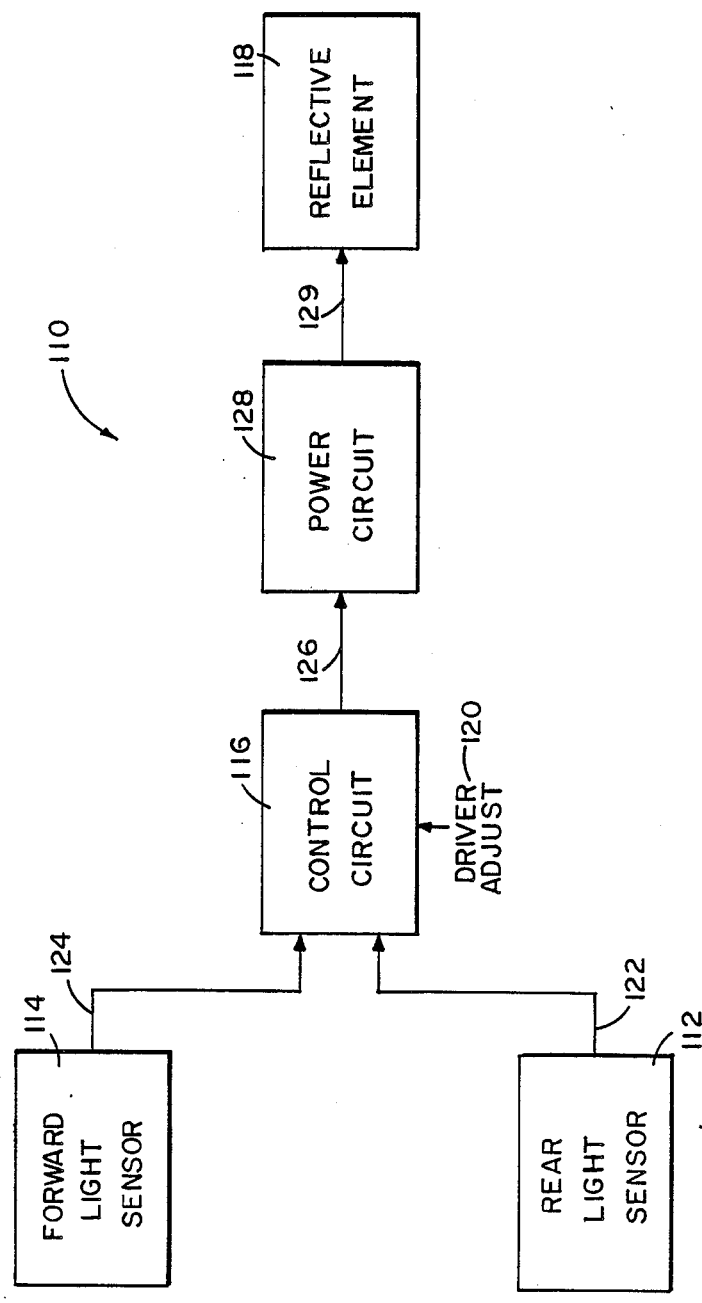
FIG. 2 is a block diagram of a digital embodiment of the control circuit.

A digital implementation or embodiment of the automatic rearview mirror is illustrated in FIG. 2 and generally designated 110. The mirror includes a rear light sensor 112, a forward light sensor 114, a control circuit 116, a drive circuit 128, a reflective element 118, and a driver sensitivity adjustment 120. The control circuit 116 is responsive to both the rear and forward light sensors 112 and 114 to actuate the reflective element 11 between and/or among a plurality of reflective conditions in a manner dependent on the relationship of the rear and forward light levels. The driver sensitivity adjustment 120 enables the vehicle operator to manually or otherwise adjust the "sensitivity" of the mirror.

The rear light sensor 112 and the forward light sensor 114 are generally well known to those having ordinary skill in the art. Preferably, the sensors 114 and 112 provide a linear electrical response to light which facilitates subsequent calculations in the control circuit. It is also possible that filters (not shown) may be used in combination with the sensors 114 and 112 to match the spectral response of the sensors to the spectral response of the human eye. The specific filter and sensor combination used in the preferred embodiment is illustrated in copending application Ser. No. 043,209, filed on even date by Gahan, entitled AUTOMATIC REARVIEW MIRROR WITH FILTERED LIGHT SENSORS, and assigned to the assignee of the present application, the disclosure of which is incorporated by reference. The light current of both sensors 112 and 114 varies generally proportionally to the light received thereby; and therefore each sensor provides an indication of the amount of light or level of light directed onto the sensor.

In the present embodiments, the sensors are mounted directly in the mirror casing; however, it is anticipated that the sensors could be mounted in other locations. The rear light sensor 112 is arranged and shielded to be affected only by light rearward of the mirror casing to provide an indication of the light directed into or onto the reflective element 118. The forward light sensor 114 is arranged and shielded to be affected only by light forward of the mirror casing to provide an indication of ambient lighting.

The reflective element 118 is also generally well known to those having ordinary skill in the art. As currently contemplated, the reflective element 118 is an electrochromic (EC) reflective cell having infinite variability of reflectivity from a maximum of approximately 70 or 80% to a minimum of approximately 4 to 7%. The terms "reflective state", "reflective condition", and "reflective mode" are synonymous and all refer to the percentage or portion of the light or image reflected by the element 118.

The control circuit 116 is a digital device currently implemented as a single-chip microprocessor. The control circuit 116 includes on-board analog-to-digital (A/D) convertors for converting the analog signals received from the sensors 112 and 114 into digital form. The description of the operation of the control circuit 116 is set forth hereinafter in conjunction with the flow charts of FIG. 2.

The drive circuit 128 is a hybrid digital/analog circuit capable of driving the EC reflective element 118 to the desired reflective state in response to the control circuit 116, which outputs a signal on line 126 indicative of the percentage reflectance desired in the reflective element. The drive circuit 128 receives this signal and issues drive commands over line 129 to the reflective element 118 to drive the reflective element to the desired reflectance condition. Power circuits capable of performing this function are generally well known to those having ordinary skill in the electronics and electrochromic arts. Therefore, the circuit will not be described here in further detail.

The driver sensitivity adjustment 120 is generally well known to those having ordinary skill in the art and provides a means whereby the vehicle operator can manually select the sensitivity of the mirror. In the digital embodiment 110, the driver sensitivity adjustment 120 is a 16-position switch which can be read by the digital control circuit 116. Therefore, the switch provides 16 separate and unique levels of sensitivity adjustment. Of course, other numbers of levels could be selected as a matter of design choice. Additionally, the adjustment 120 could be a potentiometer with the use of an appropriate A/D convertor in the control circuit 116.

The digital embodiment 110 includes a control circuit 116 which is responsive to the light sensors 112 and 114, and the driver sensitivity adjustment 120, to regulate or control the reflective state of the reflective element 118. Specifically, the control circuit 116 digitally implements ocular modeling including adaptation and glare tolerance computation. The glare tolerance computation performed by the control circuit 116 is digitally continuous over the entire range of ambient light. The automatic glare tolerance computation is performed without input from the driver.

Figure 3:
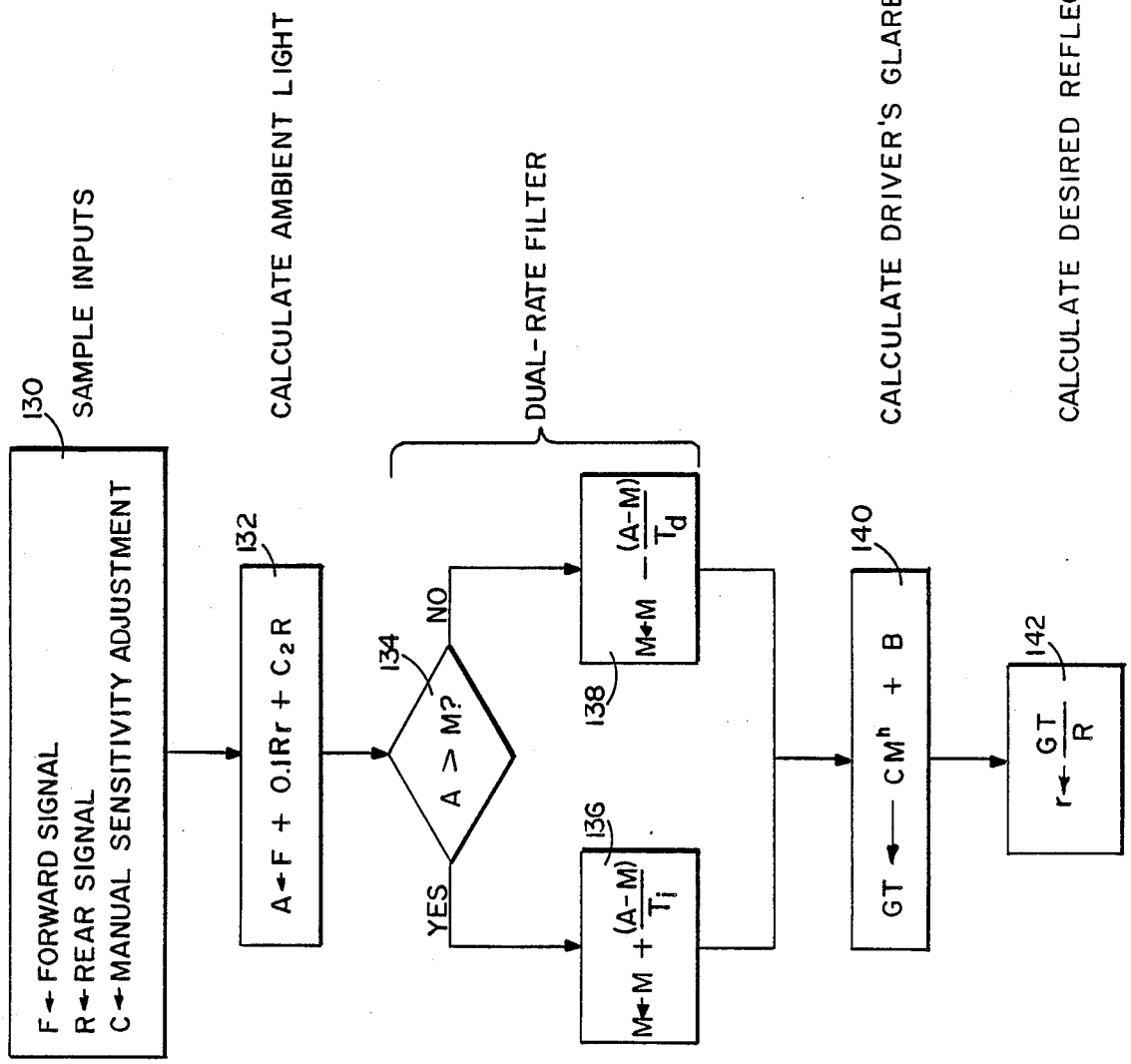
FIG. 3 is a flowchart illustrating the process steps of the mathematical model of the control circuit.

The function and operation of the control circuit 116 is illustrated in the flow chart of FIG. 3. All of the processes and functions illustrated in FIG. 3 are performed four times per seconds (4 Hz). Of course, other sampling rates could be selected as desired.

At the beginning of each update cycle, the various inputs to the control circuit 116 are sampled as illustrated in block 130. As indicated above, both the rear light signal and the forward light signal received on lines 122 and 124, respectively, are analog signals and are converted to digital format by an on-board multichannel A/D convertor. The digitized rear and forward signals are placed in the variables R and F, respectively. Also as mentioned above, the manual driver sensitivity switch 120 is read and the variables C and B are established from a look-up table wherein C is in the range 0.25 to 5 and B is in the range 0 to 0.5 lux.

The next step in the update cycle is the calculation of the ambient light level (A) as illustrated in block 132. The ambient light is calculated according to the following equation:

$$A = F + c_1 Rr + c_2 R$$

Where
r is the percent reflectance of the present mirror state
$c_1$ and $c_2$ are constants The three terms in this equation correspond to three different components of the ambient light within the driver's field of view. These three components are (1) the light forward of the mirror housing (F), (2) the light reflected into the driver's eyes from the rearview mirror ($c_1 Rr$), and (3) the light reflected into the driver's eyes off the windshield, the windshield pillars, the headliner, the rearview mirror frame, the dashboard, and outside rearview mirrors ($c_2 R$). Empirical observations indicate that an appropriate value for $c_1$ is 10%; while values in the range of 5% to 15% have been found operationally acceptable. Empirical observations indicate that an appropriate value for $c_2$ presently is 6%. Other values in the range 3% to 12% have been found to be operationally acceptable. It is envisioned that other values for $c_1$ and $c_2$ may provide proper operation depending upon the physical characteristics of the automobile. Although the "best" approximation of the ambient light includes all three terms, it is possible to omit the second or third term from the ambient light calculation and still provide an acceptable rearview mirror.

The next portion of the flow chart as illustrated in blocks 134, 136, and 138 is the digital implementation of eye-adaptation modeling. In block 134, the ambient signal A is compared to the ocular adapted ambient signal M maintained from sampling cycle to sampling cycle. If A is greater than M, control passes to block 136; if A is less than or equal to M, control passes to block 138. If control passes to block 136, this means that the ambient light is increasing; and the occular adapted ambient light is filtered at a first rate. Specifically, the occular adapted ambient light is updated as follows:

$$M = M + \frac{(A - M)}{T_i}$$

$T_i$ represents the time constant used to time filter the signal in increasing ambient light conditions. Presently, this value is selected to provide a time constant of 10 seconds to approximate the human eye's adaptation to increasing light levels. If control passes to block 138, the ambient light is decreasing and the occular adapted ambient light is filtered at a second rate as follows:

$$M = M - \frac{(A - M)}{T_d}$$

$T_d$ corresponds to the time constant used to filter the ambient light signal in decreasing light conditions. Presently, this value is selected to provide a time constant in the range of 80 to 100 seconds to approximate the human eye's adaptation to decreasing light levels.

After the ocular adapted ambient signal is updated or filtered, control passes to block 140, wherein the driver's "glare tolerance" or "sensitivity" is calculated according to the following equation:

$$GT = CM^n + B$$

The driver's glare tolerance or sensitivity is a non-linear function of the filtered ambient light signal. The constants C and B are selected as noted above depending on the setting of the 16-position driver select switch. Empirical observations indicate that an appropriate value for n is in the range 0.8 to 1.3 and most desirably approximately 1.2. Through the GT or sensitivity calculation, the control circuit continually modifies the sensitivity of the control circuit to model the sensitivity of the human eye.

Finally, the desired reflectance r of the mirror is calculated in block 142. The simple ratio of GT divided by R determines the percentage of desired reflectance of the rearview mirror to provide maximum mirror reflectivity without exceeding the glare tolerance or sensitivity of the driver's eyes. At the calculated reflectance, the rearview mirror provides as much image information as possible while not introducing unacceptable or annoying glare into the driver's eyes.

The digital implementation therefore provides the eye-adaptation modeling and automatic glare tolerance compensation pursuant to the mathematical model. Further, the digital implementation closely approximates the actual ambient light seen by the driver since the ambient light is calculated as a function of both the forward and rear light signals. The ambient light calculation includes terms representing (1) light reflected into the driver's eyes from the rearview mirror and/or (2) rear light reflected into the driver's eyes from the physical components of the vehicle in the driver's view or field of sight.

III. Analog Implementation

Figure 4:
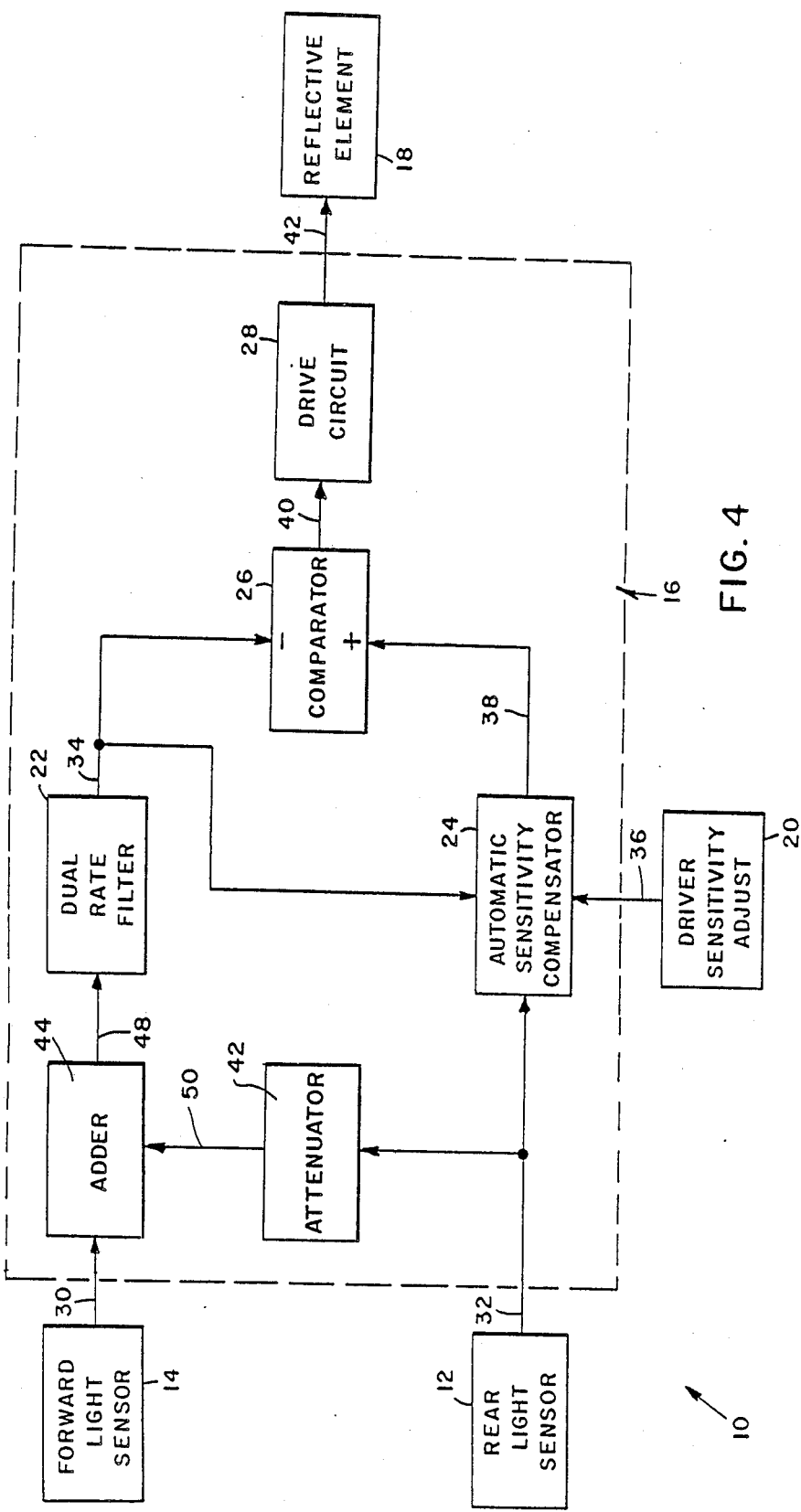
FIG. 4 is a block diagram of an analog embodiment of the control circuit.

An analog implementation or embodiment of the automatic rearview mirror is illustrated in FIG. 4 and generally designated 10. The mirror includes a rear light sensor 12, a forward light sensor 14, a control circuit 16, a reflective element 18, and a driver sensitivity adjustment 20. The control circuit 16 is responsive to both the rear and forward light sensors 12 and 14 to actuate the reflective element 18 between at least two different reflective conditions in a manner dependent on the relationship of the rear and forward light levels. The driver sensitivity adjustment 20 enables the vehicle operator to manually or otherwise adjust the "sensitivity" of the mirror (i.e., the mirror's tendency to assume a partial reflective state in response to increased rear light).

Figure 5:
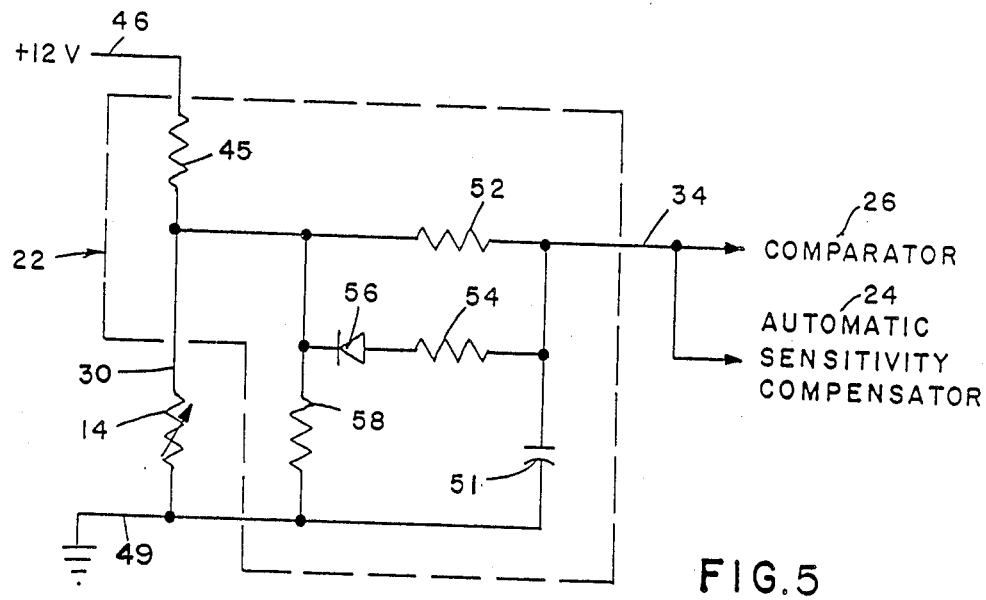
FIG. 5 is a schematic diagram of the analog multiple-rate filter.
Figure 6:
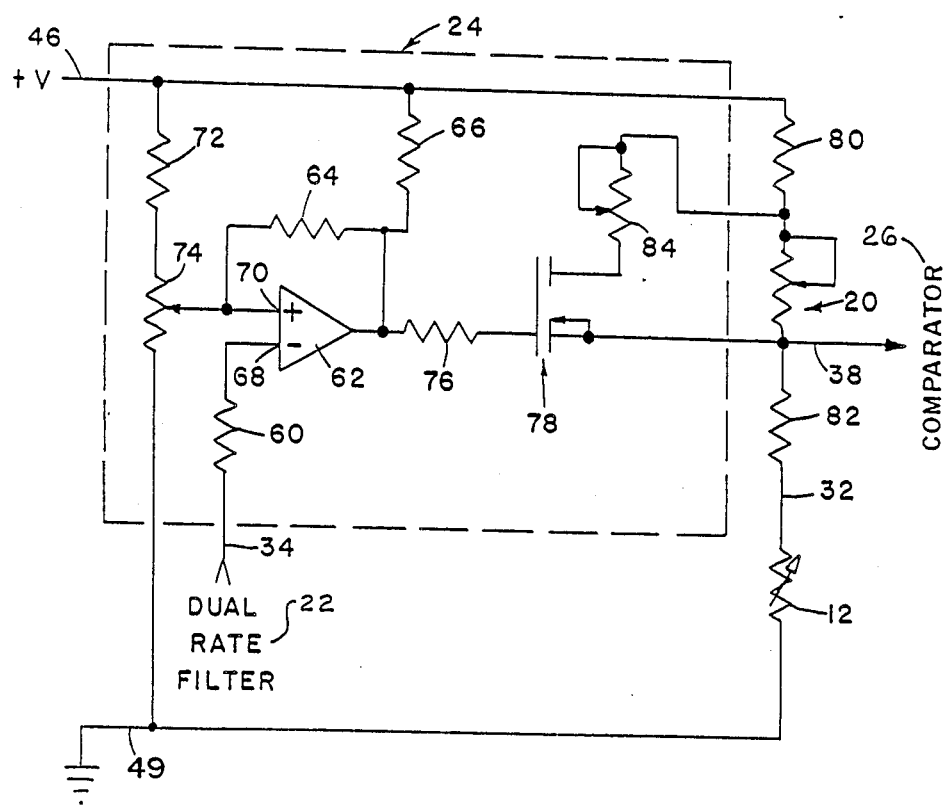
FIG. 6 is a schematic diagram of the analog ambient-dependent sensitivity adjustment.

The rear light sensor 12 (FIGS. 4 and 6) and the forward light sensor 14 (FIGS. 4 and 5) are generally well known to those having ordinary skill in the art. The specific sensors used in the present analog embodiment are photoresistors. The resistance of each sensor is inversely proportional to the light impinging thereon. Consequently, the signal outputted on lines 30 and 32 are inversely proportional to the light impinging on the forward and rear light sensors.

The reflective element 18 is also generally well known to those having ordinary skill in the art. The remainder of the description of the analog embodiment discusses a reflective element or prism having two reflective states. Any reference to the control circuit 16 actuating the mirror "between" reflective states also extends to refer to a control circuit actuating the reflective element 18 "among" reflective states.

The driver sensitivity adjustment 20 is also well known to those having ordinary skill in the art and provides a means whereby the vehicle operator or driver can manually select the sensitivity of the mirror.

The control circuit 16 is responsive to the rear light sensor 12, the forward light sensor 14, and the driver sensitivity adjustment 20 to regulate or control the reflective state of the reflective element 18. The control includes a dual-rate filter 22, an ambient-dependent sensitivity adjustment 24, a comparator 26, a drive circuit 28, an attenuator 42, and an adder 44. The output of the forward light sensor 14 is connected to the adder 44 via line 30; and the output of the rear light sensor 12 is connected to the ambient-dependent sensitivity adjustment 24 and the attenuator 42 through the line 32. The output of the adder 44 is connected to the dual-rate filter 22 by the line 48; and the output of the attenuator 42 is connected to the adder 44 by the line 50. The output of the dual-rate filter 22 is connected to both the comparator 26 and the ambient-dependent sensitivity adjustment 24 through the line 34. The driver sensitivity adjustment 20 is connected to the ambient-dependent sensitivity adjustment 2 through the line 36. The output of the ambient-dependent sensitivity adjustment 24 is connected to the comparator 26 through the line 38. Finally, the output of the comparator 26 is connected to the drive circuit 28 through the line 40; and the output of the drive circuit 28 is connected to the reflective element 18 through the line or other means 42.

The attenuator 42 and the adder 44 together produce an ambient light signal on line 48 which is a combination of the forward light signal from line 30 and an attenuated portion of the rear light signal from line 32. The attenuator 42 outputs on line 50 fractional portion of the signal received on line 32. In the preferred embodiment, the output signal is approximately 6% of the input signal. Experimentation to date indicates that other acceptable values are in the range of 3% to 15%. The attenuated portion of the rear signal is indicative of the light reflected into the driver's eyes from the inside rearview mirror, the outside rearview mirror, the inside of the windshield, the headliner and the pillars. The adder 44 sums the forward signal received on line 30 with the attenuated rear signal received on line 50 to output the ambient signal calculation.

The dual-rate or multiple-rate filter 22 (FIG. 5) filters or time averages the signal received from the forward light sensor 14 with a first time constant during increasing forward lighting and with a second longer time constant during decreasing forward lighting. The dual-rate filter includes a resistor 45 coupled in series with the forward light sensor 14 between a power supply line 46 and a ground line 49. A capacitor 51 is coupled between the output line 34 and the ground line 49. A charging resistor 52 is coupled between the input line 30 and the output line 34; and a discharge resistor 54 is coupled in parallel with the charging resistor 52. A diode 56 is joined in series with the discharge resistor 54 to permit current flow in only one direction therethrough. Finally, a bleed resistor 58 is coupled between the input line 30 and the ground line.

The resistance of the charging resistor 52 is larger, and preferably much larger, than the resistance of the discharging resistor 54. In the preferred embodiment, the resistance of the charging resistor 52 is approximately ten times the parallel equivalent resistance of the charging and discharging resistors 52 and 54. The capacitor 50 is charged through the resistor 52 and discharged through the resistors 52 and 54. During periods of low ambient lighting, the resistance of the forward light sensor 14 is relatively high; and the voltage on input line 32 is also relatively high. If this voltage exceeds the charge on the capacitor 51, the capacitor will be charged through the resistor 52. Preferably, the charging resistor 52 and capacitor 51 are selected to provide a time-averaging time constant of approximately 100 seconds. The time constant as used herein is the period of time required for the capacitor to store 66 percent of the difference between the input voltage on the line 30 and the output voltage on the line 34. During periods of high ambient lighting, the resistance of the forward sensor 14 will be relatively low; and the voltage on input line 30 will be relatively low. When this voltage is less than the voltage on capacitor 51, the capacitor will discharge through both of the resistors 52 and 54. The diode 56 insures that all capacitor charging occurs through the charging resistor 52. Because of the relatively small resistance of the resistor 54 in comparison with the charging resistor 52, discharging occurs primarily through the discharge resistor Preferably, the resistor 54 is selected in conjunction with the capacitor 51 and resistor 52 to provide a discharging time constant of approximately ten seconds. Again, the time constant is that time period required to reduce the voltage on the capacitor 50 by 66 percent of the initial voltage difference between the input line 30 and the output line 34.

The multiple-rate filter 22 therefore provides time averaging under all lighting conditions. However, filtering occurs at different rates or with different profiles during charging and discharging. Specifically, the dual-rate filter is designed to operate in a manner closely approximating the adaptation of the human eye to differing light conditions. For example, the filter responds or adapts relatively quickly to increasing lighting conditions, and responds or adapts relatively slowly to decreasing lighting conditions.

The ambient-dependent sensitivity adjustment or compensator 24 (FIG. 4) is responsive to the filtered ambient signal to automatically adjust or compensate the mirror between two states depending on the ambient light condition. This compensation is a crude approximation of the glare tolerance calculations performed in the mathematical model and the digital implementation. In the analog embodiment, the mirror automatically adjusts its sensitivity at an ambient light level of 5 lux or 0.5 foot candle. At ambient light levels above 5 lux, typically city driving, the sensitivity of the mirror is decreased; while at ambient light levels below 5 lux, typically country driving, the sensitivity of the mirror is increased. This automatic sensitivity compensation is performed without input from the driver.

The filtered ambient light signal is received by the adjustment 24 from the dual-rate filter 22 through the line 34. This signal is inputted through a resistor 60 to the noninverting input of an op amp 62. The op amp 62 is configured with the resistors 64 and 66 to function as a comparator with hysteresis for the two inputs 68 and 70. A resistor 72 and potentiometer or pot 74 are coupled in series between the reference line 46 and the ground line 49. The pot 74 is factory preset to provide a signal at positive input 70 of op amp 62 corresponding to an illumination level or intensity of 5 lux. Consequently, the output of the op amp 62 is low when the ambient light signal is below 5 lux and is high when the ambient signal is above 5 lux. The output of the op amp is connected through the resistor 76 to the control terminal of a field effect transistor (FET) 78. Consequently, the FET 78 is nonconducting when the ambient light level is below 5 lux and conducting when the ambient light level is above 5 lux.

The driver sensitivity adjustment is a pot 20 coupled in series with resistors 80 and 82 and the rear light sensor 12 between the supply line 46 and the ground line 49. The driver-selected setting of the pot 20 partially regulates or controls the amount or percentage of the rear light signal sent to the comparator 26 via the line 38. A factory preset potentiometer 84 is coupled between the FET 78 and a point between the resistor 80 and the potentiometer 20. When the ambient light level falls below 5 lux, the output of op amp 62 is low; and the FET 78 is nonconductive. When the ambient light level rises above 5 lux, the output of the op amp 62 is high and the FET 78 is switched-in or rendered conductive to place the pot 84 in parallel with the driver sensitivity pot 20. This decreases the resistance between the resistor 80 and the resistor 82 to decrease the sensitivity of the mirror by sending a larger proportion of the rear light signal to the comparator 26 via the line 38. The adjustment on the pot 84 determines the degree of sensitivity decrease when the field effect transistor 78 is switched in.

In the preferred embodiment, the circuit components have the following values:

| Number | Type | Value |
| --- | --- | --- |
| 20 | Potentiometer | 1.2 megaohm |
| 45 | Resistor | 270 kohm |
| 51 | Capacitor | 220 mfd |
| 52 | Resistor | 470 kohm |
| 54 | Resistor | 47 kohm |
| 58 | Resistor | 560 kohm |
| 60 | Resistor | 470 kohm |
| 64 | Resistor | 1,000 kohm |
| 66 | Resistor | 10 kohm |
| 72 | Resistor | 470 kohm |
| 74 | Potentiometer | 1,000 kohm max |
| 76 | Resistor | 100 kohm |
| 80 | Resistor | 39 kohm |
| 82 | Resistor | 15 kohm |
| 84 | Potentiometer | 1,000 kohm max |

The output of the dual-rate filter 22 which is dependent on the forward light level is applied to the comparator 66 via line 34; and the output of the ambient-dependent sensitivity adjustment 24 which is dependent primarily on the rear light level is applied to the comparator 26 via the line 38. The comparator 26 outputs a low signal if the output of the dual-rate filter 22 is less than the output of the adjustment 24 and outputs a high signal if the output of the adjustment 24 is less than that of the filter 22.

The drive circuit 28 is also generally well known to those having ordinary skill in the art and actuates the reflective element 18 to switch or actuate it between its reflective conditions. When the output of the comparator 26 is low, the drive circuit 28 returns or maintains the reflective element to its full reflective state; and when the output of the comparator 26 is high, the drive circuit actuates or maintains the reflective element to a partially reflective state. For variable reflectivity applications, the comparator 26 would be replaced by a control and drive circuitry to provide an infinitely variable control signal to the drive circuit 28 which would in turn actuate the reflective element 18 to any one of a virtually infinite number of reflective states.

IV. Conclusion

The present mirror circuitry therefore approximates both the dynamic glare tolerance and the adaptation of the human eye as a result of fluctuating light levels. The adaptation of the eye is simulated through the time-averaging of the ambient light signal more slowly to decreasing light levels than to increasing light levels. The shifting or dynamic glare tolerance of the eye is simulated through the glare tolerance compensation which renders the mirror more sensitive to rear light in relatively low ambient lighting conditions than in higher ambient lighting conditions. The modeling of the human eye provided by the present mirror circuitry enables a large amount of image information to be provided to the vehicle driver while still providing changes in the reflective state of the mirror required to reduce or even eliminate glare from the rearview mirror The present mirror therefore enhances the safe operation of passenger cars and other motor vehicles incorporating this structure.

The above description is that of a preferred embodiment of the invention. Various alterations and changes can be made without departing from the spirit and broader aspects of the invention as set forth in the appended claims, which are to be interpreted in accordance with the principles of patent law including the doctrine of equivalents.

The embodiments of the invention in which an exclusive property or privilege is claimed are defined as follows:

1. An automatic rearview mirror system for a vehicle comprising:
   a reflective element actuable between at least two different reflective conditions;
   a forward light sensor to detect light forward of the mirror;
   a rear light sensor to detect light rearward of the mirror;
   a control circuit means coupled to said reflective element, said forward light sensor, and said rear light sensor for causing said reflective element to assume a reflective state dependent upon the output of said forward and rear light sensors, said control circuit means including a time-filter means for time filtering an ambient light signal which is at least partially dependent on the output of said forward sensor, said time-filter means providing faster time filtering of the signal during periods of increasing ambient light than during periods of decreasing ambient light, whereby said time-filter means and therefore said control circuit means approximates the adaptation of the human eye to changing ambient light levels.

2. A rearview mirror system as defined in claim 1 wherein said time-filter means filters with a first time constant during periods of an increasing ambient light signal and with a second time constant during periods of a decreasing ambient light signal.

3. A rearview mirror system as defined in claim 2 wherein said time-filter means comprises a single capacitor, first and second resistors connected to a common side of said capacitor, and current control means for charging said capacitor through said first resistor and discharging said capacitor through said second resistor.

4. A rearview mirror system as defined in claim 2 wherein said second time constant is approximately ten times larger than said first time constant.

5. A rearview mirror system as defined in claim 4 wherein said second time constant is approximately 80 to 100 seconds and said first time constant is approximately 10 seconds.

6. A rearview mirror system as defined in claim 1 wherein the reflectance of said reflective element is essentially continuously variable.

7. A rearview mirror system as defined in claim 1 wherein said control circuit means includes a digital device for processing the outputs of said forward and rear light sensors.

8. An improved control system for a rearview mirror for a vehicle, said mirror having a reflective element actuatable between at least two different reflective states comprising:
   ambient light sensing means for producing an ambient light signal indicative of the ambient light seen by the vehicle driver;
   rear light sensing means for producing a rear light signal indicative of the amount of light directed into the reflective element; an
   control means responsive to the ambient and rear light signals for indicating the desired reflective state of the reflective element based on the ambient and rear light signals;
   wherein the improvement comprises said control means including a multiple-rate filter means for time-averaging the ambient light signal, said filter means providing time-averaging at a rate dependent on the direction of change of the ambient light signal.

9. An improved rearview mirror control system as defined in claim 8 wherein said multiple-rate filter means includes a capacitor, first and second resistors coupled to a common side of said capacitor, and current control means for charging said capacitor through one of said resistors and for discharging said capacitor through the other of said resistors.

10. An improved rearview mirror control system as defined in claim 8 wherein said multiple-rate filter means time-averages with a first time constant during increasing ambient light and with a second time constant during decreasing ambient light.

11. An improved rearview mirror control system as defined in claim 10 wherein said first time constant is approximately 10 seconds and said second time constant is approximately 80 to 100 seconds.

12. An improved rearview mirror control system as defined in claim 10 wherein said second time constant is approximately 10 times said first time constant.

13. An improved rearview mirror control system as defined in claim 8 wherein the reflectance of said reflective element is essentially continuously variable.

14. An improved rearview mirror control system as defined in claim 8 wherein said control means includes a digital device for processing the outputs of said ambient and rear light sensing means.

15. A control system for a vehicle rearview mirror including a reflective element having different reflective states, said control system comprising:
   actuator means for actuating the reflective element between its reflective states;
   rear light sensing means for detecting the intensity of light generally incident to the mirror;
   ambient light sensing means for detecting the intensity of light in at least one direction other than generally incident to the mirror; and
   control means responsive to said rear light sensing means and said ambient light sensing means for indicating to said actuator means the desired reflective state of the reflective element based on rearward and ambient light levels, said control means including an averaging means for averaging a signal at different rates dependent on the history of the signal, the signal being at least partially dependent on the output of said ambient light sensing means.

16. A control system as defined in claim 15 wherein the rate is dependent on the direction of change of the signal.

17. A control system as defined in claim 16 wherein said averaging means average using a first time constant when the signal is increasing and a second time constant when the signal is decreasing.

18. A control system as defined in claim 17 wherein the signal is averaged over a relatively short period of time when the signal is increasing and over a relatively long period of time when the signal is decreasing.

19. A control system as defined in claim 15 wherein said averaging means include a single capacitor, first and second resistors coupled to a common side of said capacitor, and switching means for charging said capacitor through one of said resistors and discharging said capacitor through the other of said resistors.

20. A control system as defined in claim 15 wherein the reflectance of said reflective element is essentially continuously variable.

21. A control system as defined in claim 15 wherein said control means includes a digital device for processing the outputs of said ambient and rear light sensing means.

22. An automatic rearview mirror system comprising:
   reflective means for reflecting images in at least two separate reflective conditions;
   a rear light sensor means for producing a rear signal indicative of the amount of light rearward of said reflective means;
   a forward light sensor means for producing a forward signal indicative of light forward of said reflective means;
   ambient signal means for producing an ambient signal which is at least partially dependent on the forward signal;
   an ambient light filter means for time averaging the ambient signal to produce an occular adapted signal; and
   control means for actuating said reflective means between its reflective conditions in a manner dependent upon the relationship of the rear signal to the occular adapted signal, said control means including driver sensitivity adjustment means for enabling a vehicle driver to manually alter the manner in which said control means operates to alter the sensitivity of said control means to the rear signal, said control means further including automatic glare tolerance computation means responsive to the time-averaged ambient signal for automatically altering the manner in which said control means responds to the rear signal to automatically change the sensitivity of said reflective means.

23. An automatic rearview mirror system as defined in claim 22 wherein said ambient light filter means is a time-averaging filter providing time-averaging at a first rate when the ambient signal is increasing and at a second different rate when the ambient signal is decreasing to approximate the adaptation of the human eye to changing light levels.

24. A control system for an automatic rearview mirror having a reflective element operable between at least two reflective conditions, said control system comprising:
   a rear light sensor means for sensing the level of light in a rear direction;
   a second light sensor means for sensing the level of light in a second direction other than the rear direction; and
   control means responsive to said rear and second light sensor means for indicating the desired reflective condition of the reflective element as a function of the rear and second light levels, said control means including compensation means responsive to at least said second light sensor means for automatically changing the sensitivity of said control means to the rear light level.

25. A control circuit as defined in claim 24 further comprising filter means for time averaging a signal which is at least partially dependent on the second light level, said filter means time-averaging the signal at a first rate when the signal is increasing and at a second different rate when the signal is decreasing.

26. A control system as defined in claim 24 wherein the signal is dependent on both the second light level and the rear light level.

27. A control system as defined in claim 26 wherein the signal is derived by adding an attenuated portion of the rear light level to the second light level.

28. A control circuit as defined in claim 24 further comprising manual sensitivity adjustment means for permitting the vehicle driver to further manually change the sensitivity of said control means to the rear light level.

29. A control circuit as defined in claim 24 wherein said compensation means includes:
   reference means for establishing a reference signal corresponding to a given level of light;
   comparator means for comparing the reference signal with a second signal dependent on the level of ambient light; and
   switching means responsive to said comparator means for switching said compensator means into operation with said control means when said second signal and said reference signal have a desired relationship.

30. A control circuit as defined in claim 24 wherein said control means includes a digital device.

31. A control circuit as defined in claim 24 wherein said reflective element has generally continuous reflectance variability.

32. A control system as defined in claim 24 wherein the reflectivity of the reflective element is generally continuously variable.

33. An automatic rearview mirror comprising:
a reflective element having at least two reflective states;
rear sensor means for sensing the level of light in a rear direction facing said reflective element and emitting a rear signal dependent thereon;
second sensor means for sensing the level of light in at least one direction other than said rear direction and emitting a second signal dependent thereon;
control means for actuating said reflective element between its reflective states as a function of the rear and second signals, said control means including glare tolerance adjustment means responsive at least to the second signal for changing the sensitivity of the control means to the rear signal.

34. An automatic rearview mirror as defined in claim 33 wherein said adjustment means is responsive to an ambient light signal at least partially dependent on the second signal, and wherein said control means includes averaging means for time-averaging the ambient signal according to a first profile when the ambient signal is increasing and according to a second different profile when the ambient light is decreasing.

35. An automatic rearview mirror as defined in claim 33 wherein said control means includes a digital device.

36. An automatic rearview mirror as defined in claim 33 wherein said reflective element has a multiplicity of reflective states.

37. An automatic rearview mirror as defined in claim 34 wherein the ambient light signal is dependent on both the rear and second signals.

38. An automatic rearview mirror as defined in claim 37 wherein the ambient light signal is produced by adding an attenuated portion of the rear signal to the second signal.

39. An automatic rearview mirror as defined in claim 33 wherein said adjustment means includes:
reference means for establishing a reference signal corresponding to a selected light level; and
switching means for altering the output of said control means based on the relationship of the ambient signal to the reference signal.

40. A vehicle rearview mirror comprising:
a reflective element having at least two reflective states;
rear light sensor means for outputting a rear signal responsive to the level of light rearward of said mirror;
forward light sensor means for outputting a forward signal responsive to the level of light in a direction other than rearward of said mirror;
control means responsive to the rear signal and the forward signal for generating a control signal indicative of a desired reflective state of said reflective element, said control means including ambient signal means for outputting an ambient signal as a function of the rear signal and the forward signal, said control means further including means for outputting the control signal as a function of the rear signal and the ambient signal.

41. A rearview mirror as defined in claim 40 wherein said ambient signal means includes means for adding an attenuated portion of the rear signal to the forward signal to produce the ambient signal.

42. A rearview mirror as defined in claim 41 wherein the attenuated portion includes a fixed percentage of the rear signal.

43. A rearview mirror as defined in claim 42 wherein said fixed percentage is between 3 percent and 15 percent.

44. A rearview mirror as defined in claim 41 wherein the attenuated portion includes a term $c_1 rR$, where $c_1$ is a constant, r is the reflectance of the reflective element, and R is the rear signal.

45. A rearview mirror as defined in claim 40 wherein the reflectivity of said reflective element is variable to a multiplicity of reflective states, and further wherein the control signal is essentially continuously variable.

46. A rearview mirror control system for a rearview mirror including a reflective component having at least two reflective states and driver means for causing the reflective element to change its reflective state, said control system comprising:
rear light signal means for outputting a rear light signal responsive to the intensity of light in a first direction generally incident on the reflective element;
second light signal means for outputting a second light signal responsive to the intensity of light in at least one second direction other than said first direction;
ambient light signal means responsive to the rear light signal and the second light signal for outputting an ambient light signal as a function of the rear light signal and the second light signal; and
control means responsive to the ambient light signal and the rear light signal for outputting a control signal as a function of the rear light signal and the ambient light signal.

47. A rearview mirror control circuit as defined in claim 46 wherein said ambient light signal means includes means for adding an attenuated portion of the rear light signal to the second light signal to produce the ambient light signal.

48. A rearview mirror control system as defined in claim 47 wherein the attenuated portion of the rear light signal is a fixed percentage of the rear light signal.

49. A rearview mirror control system as defined in claim 48 wherein the fixed percentage is in the range of approximately three percent to approximately fifteen percent.

50. A rearview mirror control system as defined in claim 47 wherein the attenuated portion is dependent on the reflectivity of the reflective component.

51. A rearview mirror control system as defined in claim 50 wherein the attenuated portion includes a term $c_1 rR$, where $c_1$ is a constant, r is the reflectivity of the reflective component, and R is the rear light signal.

52. A rearview mirror control system as defined in claim 46 wherein the reflectivity of the reflective component is essentially continuously variable to a multiplicity of reflective states, and further wherein the control signal is also essentially continuously variable.

* * * * *

UNITED STATES PATENT AND TRADEMARK OFFICE
CERTIFICATE OF CORRECTION

PATENT NO. : 4,793,690

DATED : December 27, 1988

INVENTOR(S) : Edward A. Gahan, Keith W. Molyneux and Kenneth Schofield

It is certified that error appears in the above-identified patent and that said Letters Patent is hereby corrected as shown below:

Column 4, line 26:

"tee" should be --the--.

Column 5, line 50:

"gaare" should be --glare--.

Column 6, line 12:

"control 32" should be --control 326--.

Column 6, line 47:

"element 11" should be --element 118--.

Column 6, line 54:

After "sensor 114" insert --(Fig. 2)--.

Column 10, line 40:

"adjustment 2" should be --adjustment 24--.

Column 11, line 10:

After "ground line" insert --49--.

UNITED STATES PATENT AND TRADEMARK OFFICE
CERTIFICATE OF CORRECTION

PATENT NO. : 4,793,690

DATED : December 27, 1988

INVENTOR(S) : Edward A. Gahan, Keith W. Molyneux and Kenneth Schofield

PAGE 2 OF 3

It is certified that error appears in the above-identified patent and that said Letters Patent is hereby corrected as shown below:

Column 12, lines 64 and 65:

"comparator 66" should be --comparator 26--.

Column 14, claim 8, line 39:

"an" should be --and--.

Column 15, claim 19, line 40:

"include" should be --includes--.

Column 16, claim 25, line 38:

Delete "circuit" and insert --system--.

Column 16, claim 28, line 50:

Delete "circuit" and insert --system--.

Column 16, claim 29, line 55:

Delete "circuit" and insert --system--.

Column 16, claim 30, line 67:

Delete "circuit" and insert --system--.

Column 17, claim 31, line 1:

Delete "circuit" and insert --system--.

UNITED STATES PATENT AND TRADEMARK OFFICE
CERTIFICATE OF CORRECTION

PATENT NO. : 4,793,690

DATED : December 27, 1988

INVENTOR(S) : Edward A. Gahan, Keith W. Molyneux and Kenneth Schofield

It is certified that error appears in the above-identified patent and that said Letters Patent is hereby corrected as shown below:

Column 18, claim 47, line 42:

Delete "circuit" and insert --system--.

Signed and Sealed this

Thirtieth Day of January, 1990

*Attest:*

JEFFREY M. SAMUELS

*Attesting Officer*     *Acting Commissioner of Patents and Trademarks*